US012737859B2

(12) United States Patent
Ramesh et al.

(10) Patent No.: US 12,737,859 B2
(45) Date of Patent: Sep. 15, 2026

(54) INTERNET OF THINGS CAMERA OCCLUSION REMOVAL BASED ON PRIOR IMAGE DATA

(71) Applicant: Roku, Inc., San Jose, CA (US)

(72) Inventors: Sunil Ramesh, Saratoga, CA (US); Michael Patrick Cutter, Golden, CO (US); Thejaswi Raya, Fremont, CA (US); Gregory Garner, Key Colony Beach, FL (US); Robert Caston Curtis, Napa, CA (US); David Lee Stern, Los Gatos, CA (US); Carl Sassenrath, Reno, NV (US)

(73) Assignee: Roku, Inc., San Jose, CA (US)

( * ) Notice: Subject to any disclaimer, the term of this patent is extended or adjusted under 35 U.S.C. 154(b) by 322 days.

(21) Appl. No.: 18/397,497

(22) Filed: Dec. 27, 2023

(65) Prior Publication Data

US 2025/0217945 A1 Jul. 3, 2025

(51) Int. Cl.

*G06T 5/77* (2024.01)
*G06T 5/50* (2006.01)
*G06T 7/00* (2017.01)
*H04N 23/60* (2023.01)

(52) U.S. Cl.

CPC .................. *G06T 5/77* (2024.01); *G06T 5/50* (2013.01); *G06T 7/0002* (2013.01); *H04N 23/64* (2023.01); *G06T 2207/30168* (2013.01); *G06T 2207/30232* (2013.01)

(58) Field of Classification Search

CPC ........... G06T 5/77; G06T 5/50; G06T 7/0002; G06T 2207/30168; G06T 2207/30232; H04N 23/64

USPC ........................................................ 348/241

See application file for complete search history.

(56) References Cited

U.S. PATENT DOCUMENTS

| | | | | |
|---|---|---|---|---|
| 7,634,106 | B2 * | 12/2009 | Mino | G06V 40/161 382/284 |
| 8,041,076 | B1 * | 10/2011 | Bourdev | H04N 23/611 382/118 |
| 9,406,114 | B2 * | 8/2016 | Li | G06F 3/011 |
| 2005/0129324 | A1 * | 6/2005 | Lemke | G06V 10/26 382/284 |

(Continued)

FOREIGN PATENT DOCUMENTS

JP 2013066016 A * 4/2013

*Primary Examiner* — Usman A Khan

(74) *Attorney, Agent, or Firm* — Straylight LLP

(57) ABSTRACT

Disclosed herein are system, apparatus, article of manufacture, method and/or computer program product embodiments, and/or combinations and sub-combinations thereof, for processing image and video content. An example process can include obtaining a first image frame and a second image frame corresponding to a field of view of an image sensor; identifying at least one occlusion within the second image frame based on a comparison between the first image frame and the second image frame, wherein the at least one occlusion obfuscates a portion of the field of view of the image sensor; and removing the at least one occlusion from the second image frame to yield a revised second image frame, wherein the revised second image frame includes prior image data within an area corresponding to the portion of the field of view obfuscated by the at least one occlusion.

20 Claims, 14 Drawing Sheets

(56) References Cited

U.S. PATENT DOCUMENTS

| | | | | |
|---|---|---|---|---|
| 2006/0061598 | A1* | 3/2006 | Mino | G06T 11/00<br>345/629 |
| 2008/0239092 | A1* | 10/2008 | Sugino | H04N 23/611<br>348/222.1 |
| 2010/0079491 | A1* | 4/2010 | Nonaka | G06T 11/00<br>345/630 |
| 2011/0200259 | A1* | 8/2011 | Lindskog | G06T 11/00<br>382/218 |
| 2014/0176764 | A1* | 6/2014 | Nakamura | G06V 40/169<br>348/231.99 |
| 2015/0297949 | A1* | 10/2015 | Aman | G06T 7/246<br>348/157 |
| 2017/0142343 | A1* | 5/2017 | Kawai | H04N 5/272 |
| 2019/0286887 | A1* | 9/2019 | He | H04N 23/633 |
| 2022/0116546 | A1* | 4/2022 | Gummadi | G06T 13/80 |
| 2022/0153195 | A1* | 5/2022 | Freeman-Powell | G06T 7/11 |

* cited by examiner

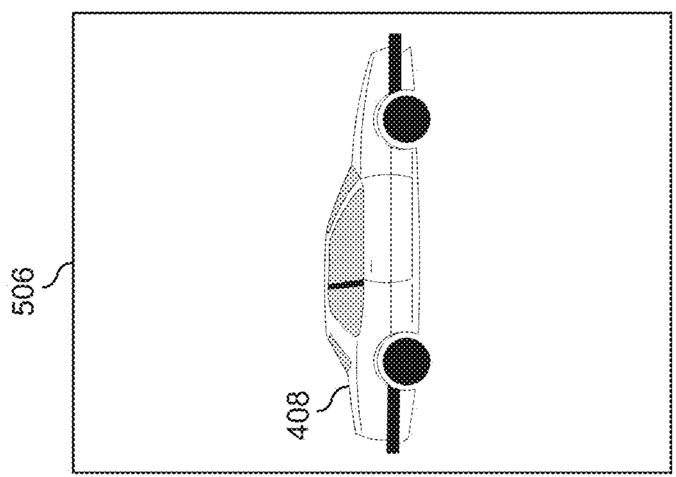
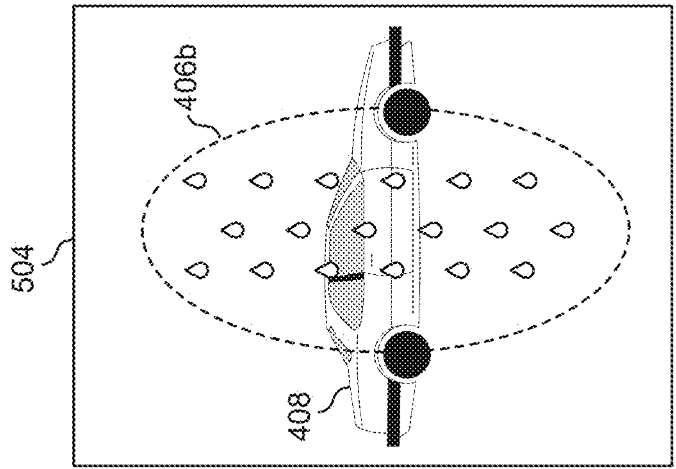
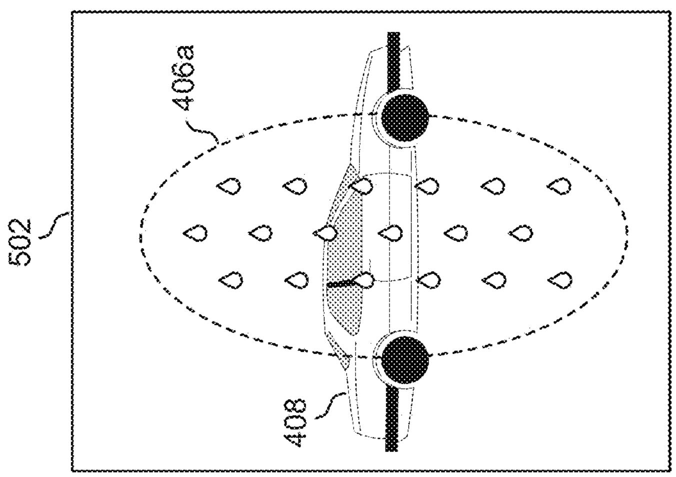
FIG. 5

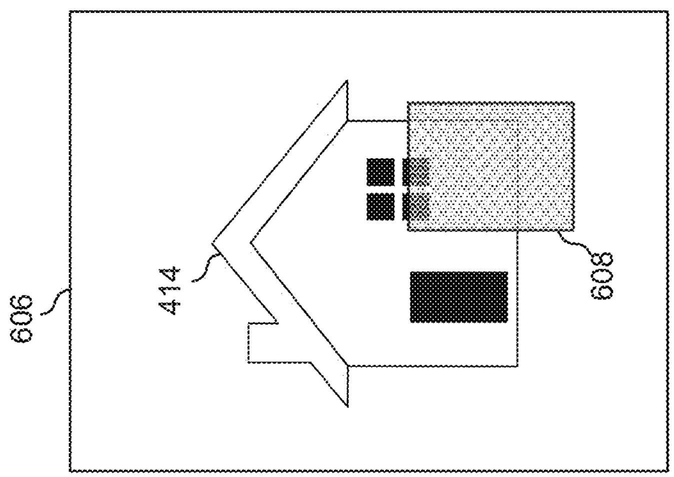
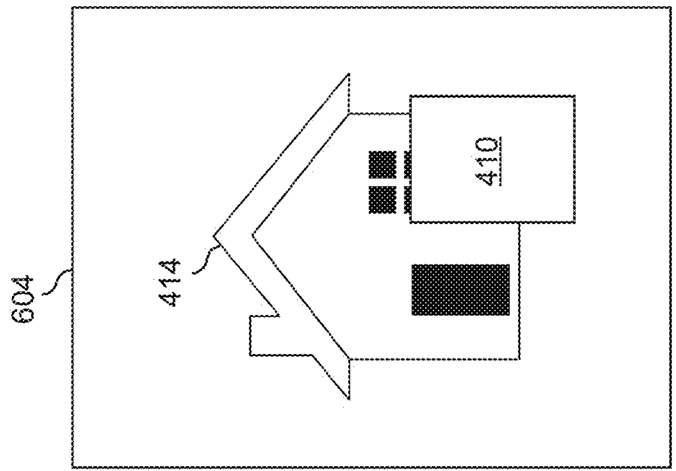
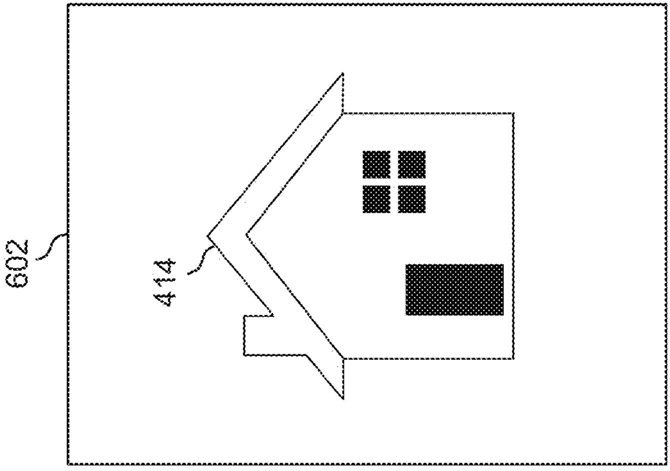
FIG. 6

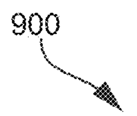

OBTAIN A FIRST IMAGE FRAME AND A SECOND IMAGE FRAME CORRESPONDING TO A FIELD OF VIEW OF AN IMAGE SENSOR
902

IDENTIFY AT LEAST ONE OCCLUSION WITHIN THE SECOND IMAGE FRAME BASED ON A COMPARISON BETWEEN THE FIRST IMAGE FRAME AND THE SECOND IMAGE FRAME, WHEREIN THE AT LEAST ONE OCCLUSION OBFUSCATES A PORTION OF THE FIELD OF VIEW OF THE IMAGE SENSOR
904

REMOVE THE AT LEAST ONE OCCLUSION FROM THE SECOND IMAGE FRAME TO YIELD A REVISED SECOND IMAGE FRAME, WHEREIN THE REVISED SECOND IMAGE FRAME INCLUDES PRIOR IMAGE DATA WITHIN AN AREA CORRESPONDING TO THE PORTION OF THE FIELD OF VIEW OBFUSCATED BY THE AT LEAST ONE OCCLUSION
906

FIG. 9

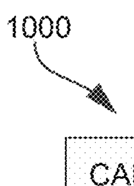

CAPTURE, BY AN IMAGE SENSOR IN A FIRST POSITION, A FIRST PLURALITY OF IMAGE FRAMES CORRESPONDING TO A FIRST FIELD OF VIEW FROM THE FIRST POSITION
1002

MOVE THE IMAGE SENSOR FROM THE FIRST POSITION TO A SECOND POSITION IN RESPONSE TO A MOVEMENT TRIGGER
1004

CAPTURE, BY THE IMAGE SENSOR IN THE SECOND POSITION, A SECOND PLURALITY OF IMAGE FRAMES CORRESPONDING TO A SECOND FIELD OF VIEW FROM THE SECOND POSITION
1006

IDENTIFY, BASED ON THE FIRST PLURALITY OF IMAGE FRAMES, AT LEAST ONE OCCLUSION WITHIN THE FIRST FIELD OF VIEW
1008

DETERMINE THAT AT LEAST A PORTION OF THE AT LEAST ONE OCCLUSION IS LOCATED IN A REGION THAT OVERLAPS WITH THE SECOND FIELD OF VIEW
1010

REMOVE THE AT LEAST ONE OCCLUSION FROM ONE OR MORE OF THE FIRST PLURALITY OF IMAGE FRAMES BY USING IMAGE DATA EXTRACTED FROM THE SECOND PLURALITY OF IMAGE FRAMES
1012

FIG. 10

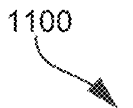
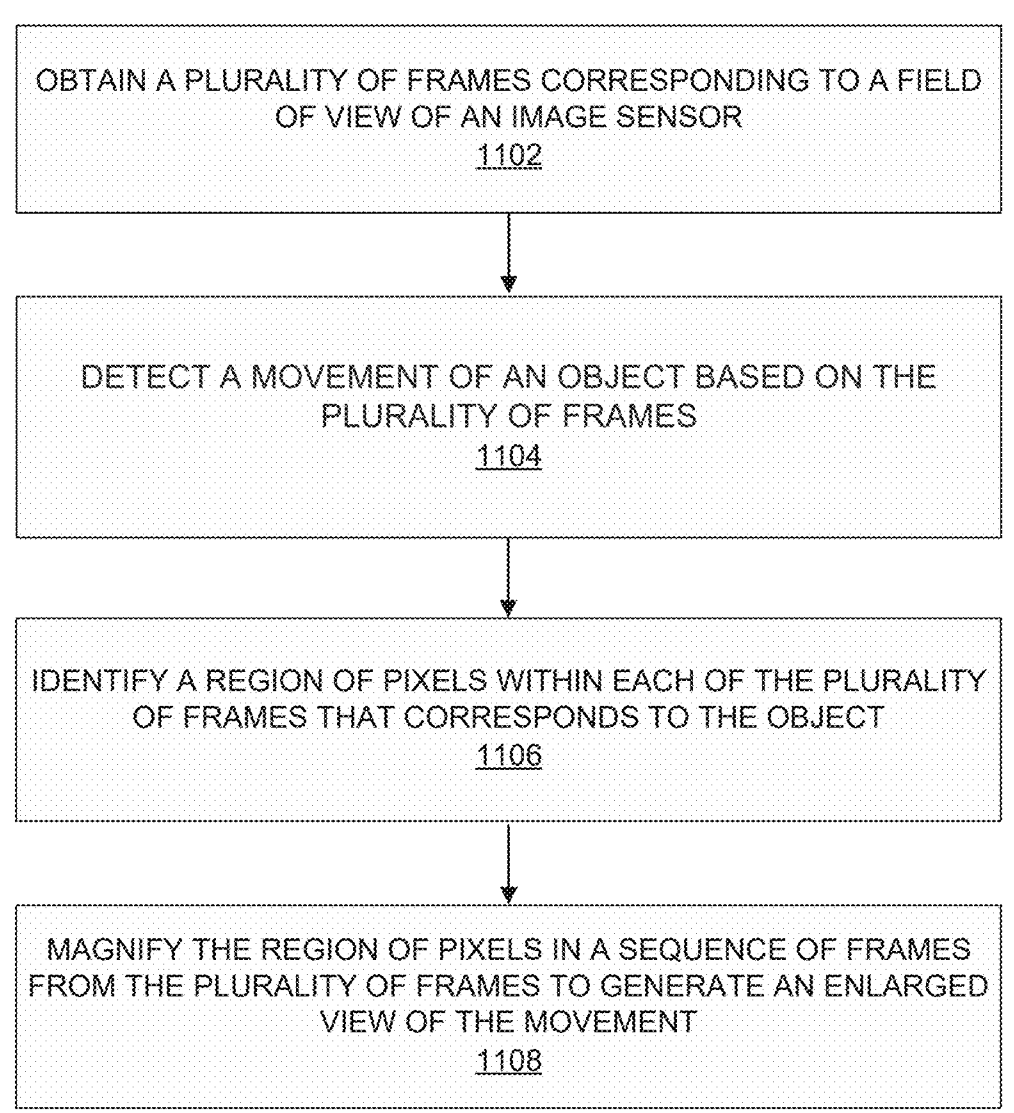
FIG. 11

INTERNET OF THINGS CAMERA OCCLUSION REMOVAL BASED ON PRIOR IMAGE DATA

BACKGROUND

Field

This disclosure is generally directed to processing image and/or video data, and more particularly, to removing occlusions from images and/or videos captured by Internet of Things (IoT) cameras.

SUMMARY

Provided herein are system, apparatus, article of manufacture, method and/or computer program product embodiments, and/or combinations and sub-combinations thereof, for optimizing automatic content recognition queries.

In some aspects, a method is provided for processing image data captured by an image sensor (e.g., an IoT camera) in order to remove occlusions. The method can operate in the image sensor, in one or more computing devices (e.g., server) that are communicatively coupled to the image sensor, and/or in a combination thereof.

The method can operate by obtaining a first image frame and a second image frame corresponding to a field of view of an image sensor. In some cases, the method can further include identifying at least one occlusion within the second image frame based on a comparison between the first image frame and the second image frame, wherein the at least one occlusion obfuscates a portion of the field of view of the image sensor. In some aspects, the method can further include removing the at least one occlusion from the second image frame to yield a revised second image frame, wherein the revised second image frame includes prior image data within an area corresponding to the portion of the field of view obfuscated by the at least one occlusion.

In some aspects, a system is provided for processing image data captured by an image sensor in order to remove occlusions. The system can include one or more memories and at least one processor coupled to at least one of the one or more memories and configured to obtain a first image frame and a second image frame corresponding to a field of view of an image sensor. The at least one processor of the system can be configured to identify at least one occlusion within the second image frame based on a comparison between the first image frame and the second image frame, wherein the at least one occlusion obfuscates a portion of the field of view of the image sensor. The at least one processor of the system can also be configured to remove the at least one occlusion from the second image frame to yield a revised second image frame, wherein the revised second image frame includes prior image data within an area corresponding to the portion of the field of view obfuscated by the at least one occlusion.

In some aspects, a non-transitory computer-readable medium is provided for processing image data captured by an image sensor in order to remove occlusions. The non-transitory computer-readable medium can have instructions stored thereon that, when executed by at least one computing device, cause the at least one computing device to obtain a first image frame and a second image frame corresponding to a field of view of an image sensor. The instructions of the non-transitory computer-readable medium can, when executed by the at least one computing device, cause the at least one computing device to identify at least one occlusion within the second image frame based on a comparison between the first image frame and the second image frame, wherein the at least one occlusion obfuscates a portion of the field of view of the image sensor. The instructions of the non-transitory computer-readable medium also can, when executed by the at least one computing device, cause the at least one computing device to remove the at least one occlusion from the second image frame to yield a revised second image frame, wherein the revised second image frame includes prior image data within an area corresponding to the portion of the field of view obfuscated by the at least one occlusion.

BRIEF DESCRIPTION OF THE FIGURES

The accompanying drawings are incorporated herein and form a part of the specification.

FIG. 5 illustrates an example of image frames that can be processed to remove an occlusion, according to some aspects of the present disclosure;

FIG. 6 illustrates another example of image frames that can be processed to remove an occlusion, according to some aspects of the present disclosure;

FIG. 9 is a diagram illustrating a flowchart of an example method for processing image data, according to some aspects of the present disclosure;

FIG. 10 is a diagram illustrating a flowchart of another example method for processing image data, according to some aspects of the present disclosure;

FIG. 11 is a diagram illustrating a flowchart of another example method for processing image data, according to some aspects of the present disclosure;

In the drawings, like reference numbers generally indicate identical or similar elements. Additionally, generally, the left-most digit(s) of a reference number identifies the drawing in which the reference number first appears.

DETAILED DESCRIPTION

Security systems can include strategically placed cameras both inside and outside the premises. These cameras have video recording capabilities to monitor and record activities in and around an area such as a residence or a building.

Users can access and review the recorded footage (e.g., video frames) through a user interface provided by the security system to view specific timeframes or to identify certain objects or events.

In some cases, occlusions may hinder a user's ability to review footage obtained by a security camera. Occlusions can be caused by weather events (e.g., precipitation, wind, sun, shadows, smoke, condensation, etc.), vegetation or foliage, insects, objects, etc. In some cases, occlusions can be short or temporary (e.g., passing thunderstorm) while in other cases occlusions may persist for a longer period of time (e.g., cobweb). Often times such occlusions can be troublesome because they are not relevant to activities in the scene and can deteriorate image/video data that could otherwise be useful in evaluating a scene or objects therein.

In addition, some types of occlusions may correspond to events that may cause undesired motion alerts. For instance, spurious events (e.g., tree branch swaying in wind) and/or events that are unwanted or uninteresting (e.g., dog running in yard) may cause undesired motion alerts to be sent to a user device. Such alerts can be burdensome or annoying, and may cause a user to inadvertently miss a desired alert or to temporarily disable a camera.

Provided herein are system, apparatus, device, method and/or computer program product embodiments, and/or combinations and sub-combinations thereof, for processing image/video data to remove occlusions. In some aspects, prior image data (e.g., from an earlier frame) can be used to filter or remove an occlusion. For instance, an IoT camera and/or one or more servers can implement algorithms that can identify and correlate occlusions with prior image data. That is, prior image data can be correlated both spatially (e.g., corresponds to same or similar group of pixels) and temporally (e.g., image data corresponds to similar congruent timeframe) in order to identify image data that can be used to perform inpainting and remove occlusions.

In some aspects, the present technology can also be used to suppress unwanted event notifications. For instance, an IoT camera can be configured (e.g., via user settings, machine learning algorithms, etc.) to suppress alerts that may be caused by spurious events and/or uninteresting events (e.g., tree branch swaying).

Figure 1:
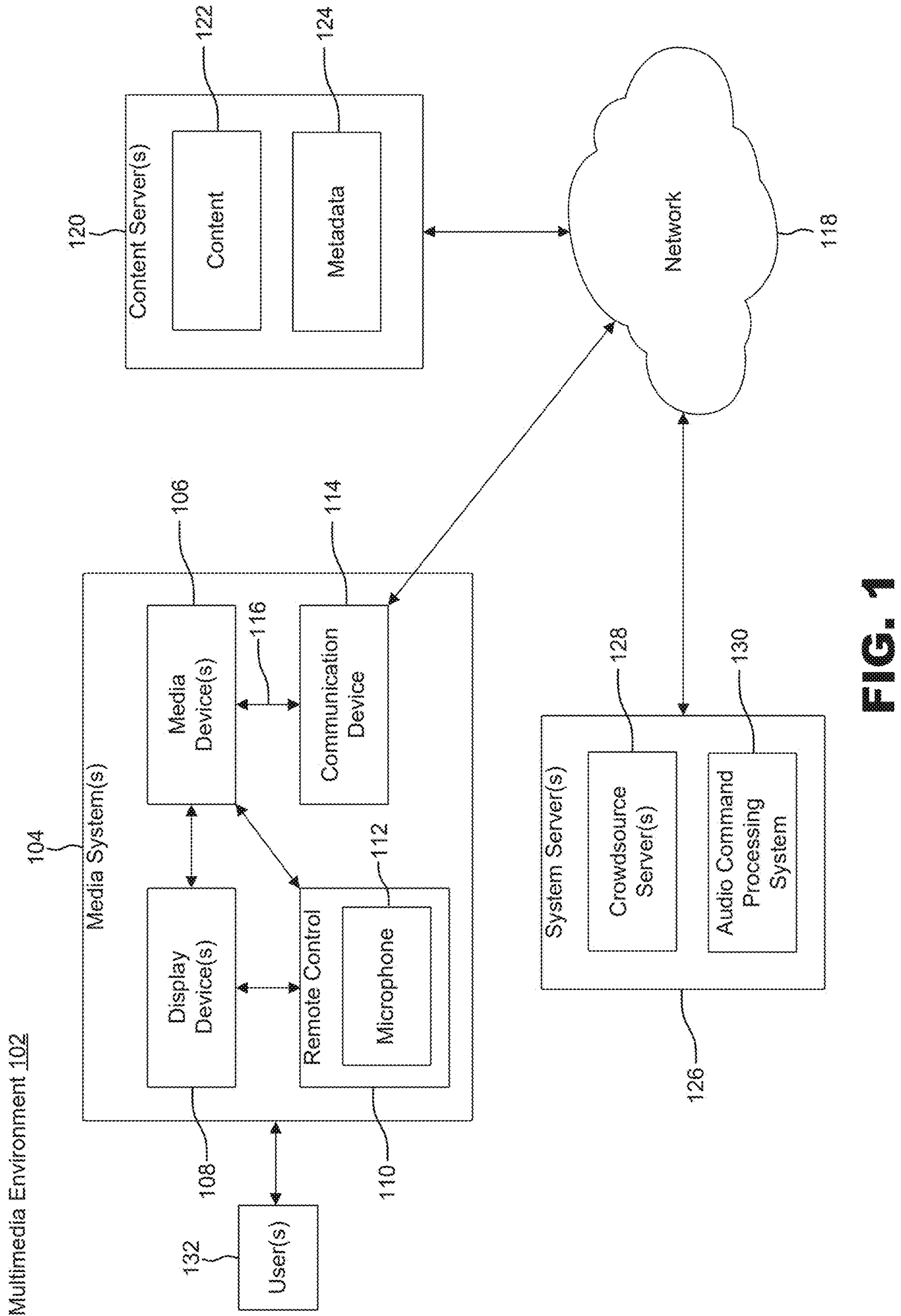
FIG. 1 illustrates a block diagram of a multimedia environment, according to some aspects of the present disclosure.

Various embodiments, examples, and aspects of this disclosure may be implemented using and/or may be part of a multimedia environment 102 shown in FIG. 1. It is noted, however, that multimedia environment 102 is provided solely for illustrative purposes and is not limiting. Examples and embodiments of this disclosure may be implemented using, and/or may be part of, environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

In some aspects, the multimedia environment 102 may be directed to multimedia surveillance and/or security systems. For example, multimedia environment 102 may include media system 104, which could represent a house, a building, an office, or any other location or space where it is desired to implement a surveillance and security system with one or more sensors (e.g., a camera, a microphone, etc.) to monitor the surrounding environment. User(s) 132 may operate with the media system 104 to consume the multimedia data (e.g., content) captured/collected by the sensors of the surveillance and security system.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some examples, media device 106 can be a part of, integrated with, operatively coupled to, and/or connected to its respective display device 108.

In some examples, media device 106 may include one or more sensors implemented within a surveillance and security system such as a camera (or a security camera), a smart camera, a doorbell camera, an IoT camera, and/or any other type of image sensor that can be used to monitor and record the surroundings. The recording or live feed that is captured by such sensors can be sent to display device 108 such as a smartphone, computer, tablet, IoT device, etc.

Each media device 106 may be configured to communicate with network 118 via a communication device 114. The communication device 114 may include, for example, a cable modem or satellite TV transceiver. The media devices 106 may communicate with the communication device 114 over a link 116, wherein the link 116 may include wireless (such as WiFi) and/or wired connections. Alternatively, or in addition, media devices 106 may include one or more transceivers that can be configured to communicate directly with network 118 and/or with other media devices 106.

In various examples, the network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, laptop computer, smartphone, wearable, on-screen controls, integrated control buttons, audio controls, or any combination thereof, to name just a few examples. In some examples, the remote control 110 wirelessly communicates with the media device 106 and/or display device 108 using cellular, Bluetooth, infrared, etc., or any combination thereof. The remote control 110 may include a microphone 112, which is further described below.

The multimedia environment 102 may include a plurality of content servers 120 (also called content providers, channels or sources). Although only one content server 120 is shown in FIG. 1, in practice, the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, targeted media content, software, recording or live feed from a surveillance and security system, and/or any other content or data objects in electronic form.

In some examples, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining to or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126. As noted above, in some cases system servers 126 may be configured to perform one or more functions associated with ACR. For instance, media devices 106 can send fingerprint(s) to system servers 126, and system servers 126 may compare the received fingerprint(s) with a fingerprint database in order to identify the associated media content.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streaming of the movie.

The system servers 126 may also include an audio command processing system 130. As noted above, the remote control 110 may include a microphone 112. The microphone 112 may receive audio data from users 132 (as well as other sources, such as the display device 108). In some examples, the media device 106 may be audio responsive, and the audio data may represent verbal commands from the user 132 to control the media device 106 as well as other components in the media system 104, such as the display device 108.

In some examples, the audio data received by the microphone 112 in the remote control 110 is transferred to the media device 106, which is then forwarded to the audio command processing system 130 in the system servers 126. The audio command processing system 130 may operate to process and analyze the received audio data to recognize the user 132's verbal command. The audio command processing system 130 may then forward the verbal command back to the media device 106 for processing.

Figure 2:
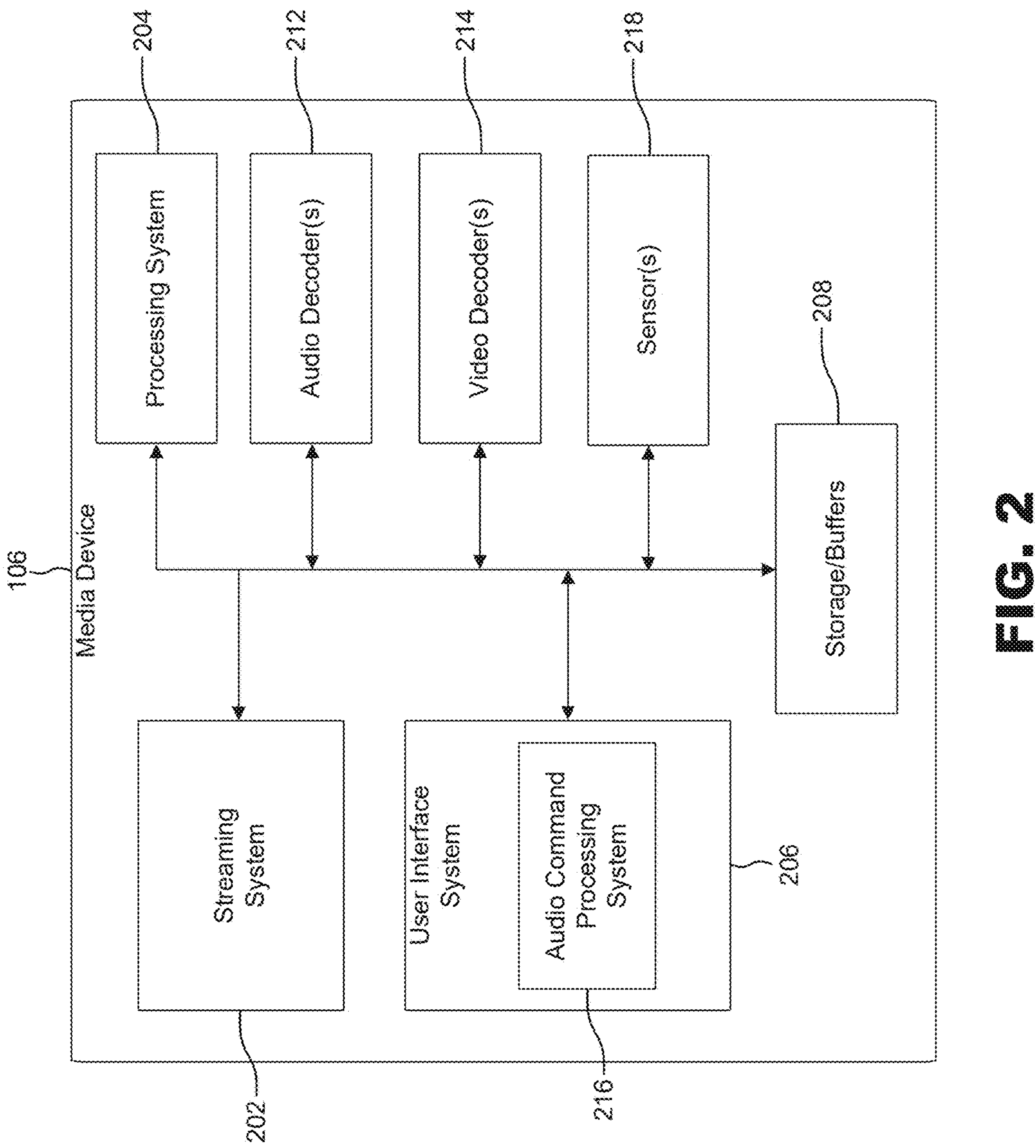
FIG. 2 illustrates a block diagram of a streaming media device, according to some aspects of the present disclosure.

In some examples, the audio data may be alternatively or additionally processed and analyzed by an audio command processing system 216 in the media device 106 (see FIG. 2). The media device 106 and the system servers 126 may then cooperate to pick one of the verbal commands to process (either the verbal command recognized by the audio command processing system 130 in the system servers 126, or the verbal command recognized by the audio command processing system 216 in the media device 106).

FIG. 2 illustrates a block diagram of an example media device 106, according to some embodiments. Media device 106 may include a streaming system 202, processing system 204, storage/buffers 208, and user interface module 206. As described above, the user interface module 206 may include the audio command processing system 216.

The media device 106 may also include one or more audio decoders 212 and one or more video decoders 214. Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples. The media device 106 can implement other applicable decoders, such as a closed caption decoder.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmy, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to, H.263, H.264, H.265, VVC (also referred to as H.266), AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

The media device 106 may also include one or more sensors 218. Examples of sensors 218 include but are not limited to image sensors, accelerometers, gyroscopes, inertial measurement units (IMUs), light sensors, positioning sensors (e.g., GNSS), any other type of sensor, and/or any combination thereof. In one illustrative example, sensors 218 may correspond to an image sensor of an IoT camera that can be configured to capture image data and/or video data as part of a security surveillance system. In some examples, media device 106 may also include one or more light sources (not illustrated). For instance, media device 106 can include an infrared (IR) light source, visible light source, laser source, or the like.

Now referring to both FIGS. 1 and 2, in some examples, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming system 202 of the media device 106 may request the selected content from the content server(s) 120 over the network 118. The content server(s) 120 may transmit the requested content to the streaming system 202. The media device 106 may transmit the received content to the display device 108 for playback to the user 132.

In streaming examples, the streaming system 202 may transmit the content to the display device 108 in real time or near real time as it receives such content from the content server(s) 120. In non-streaming examples, the media device 106 may store the content received from content server(s) 120 in storage/buffers 208 for later playback on display device 108.

Exemplary IoT Environment

Figure 3:
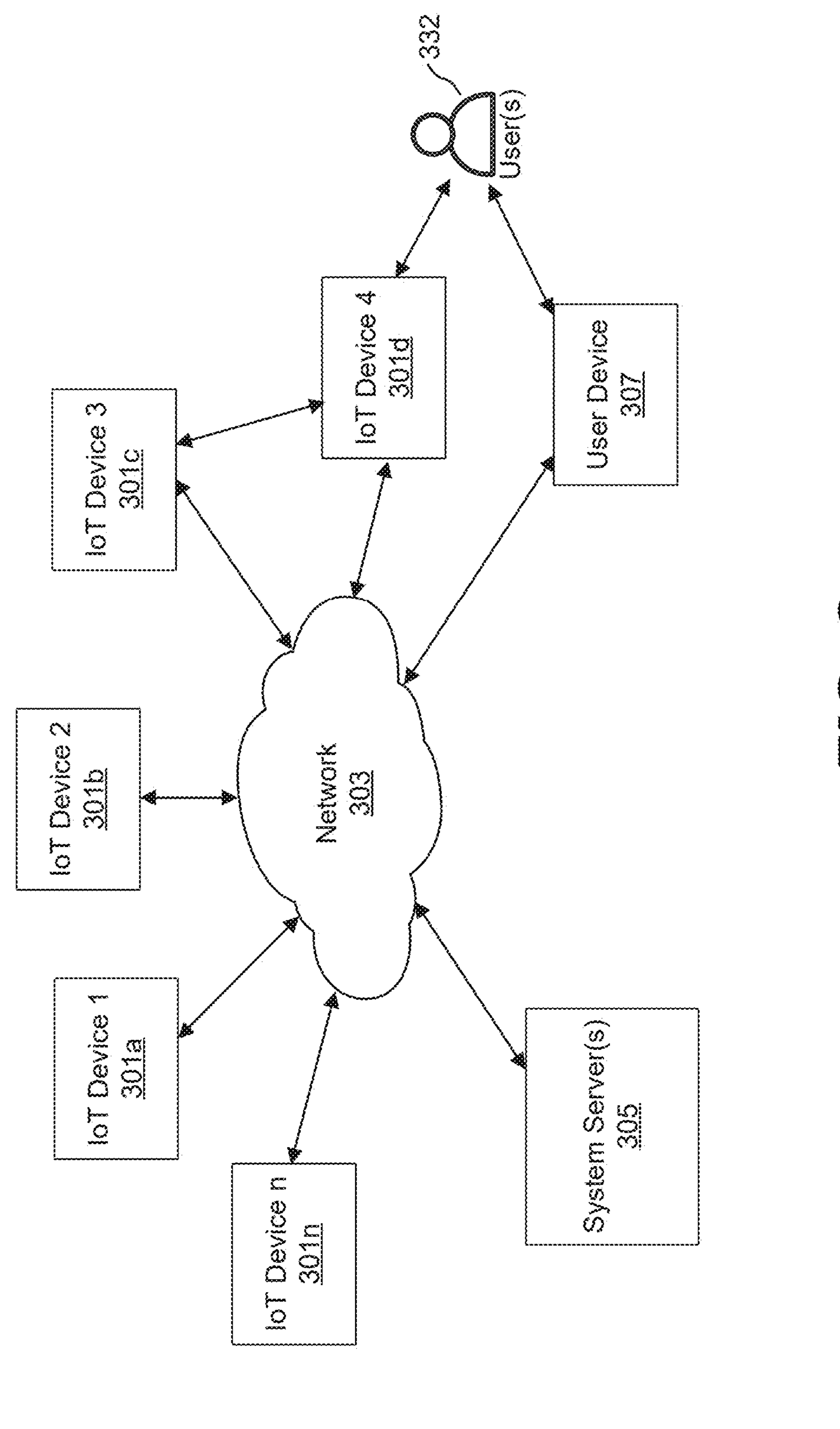
FIG. 3 illustrates a block diagram of an IoT environment, according to some aspects of the present disclosure.

FIG. 3 illustrates a block diagram of an IoT environment 300, according to some aspects of the present technology. According to some examples, IoT environment 300 can be implemented with multimedia environment 102 of FIG. 1. For example, multimedia environment 102 of FIG. 1 can be part of IoT environment 300 or vice versa.

In some cases, IoT environment 300 can include a plurality of IoT devices 301*a*-301*n* (collectively referred to as IoT devices 301), network 303, one or more system servers 305, and user device 307. According to some aspects, IoT devices 301 can be connected to, and communicate with, each other using a mesh network. In this example, when an IoT device leaves the plurality of IoT devices 301 and/or an IoT device is added to the plurality of IoT devices 301, the mesh network can be updated accordingly. In one illustrative example, network 303 can correspond to a mesh network connecting the plurality of IoT devices 301.

In some cases, the mesh network can be part of network 303. For example, IoT devices 301 can be connected to each other (e.g., communicate with each other) using the mesh network. The mesh network can be implemented using a wireless local area network (WLAN) such as WiFi. However, the present technology is not limited to this example, and the mesh network can be implemented using other types of wireless and/or wired networks. In some examples, network 303 can include the mesh network and another wireless and/or wired networks. In some aspects, network 303 can include, without limitation, mesh, wired and/or wireless intranet, extranet, Internet, cellular, Bluetooth, infrared, and/or any other short range, long range, local, regional, global communications mechanism, means, approach, protocol and/or network, as well as any combination(s) thereof.

In some configurations, IoT environment 300 can include one or more system servers 305. System servers 305 may operate to support IoT devices 301. In some examples, system servers 305 may operate to support IoT devices 301 from a cloud. It is noted that the structural and functional aspects of system servers 305 may wholly or partially exist in the same or different systems. According to some examples, IoT devices 301 can communicate with system servers 305 through network 303. In some instances, system servers 305 can be associated with system servers 126 of FIG. 1. For example, the structural and functional aspects of system servers 305 may wholly or partially exist in the same or different ones of the system servers 126.

In some instances, system servers 305 can include one or more user accounts associated with IoT devices 301 and/or their associated network 303. In a non-limiting example, IoT devices 301 can include IoT devices associated with a physical property of user 332 on one network 303. In this example, IoT devices 301 and network 303 can be associated with the user account of user 332.

IoT environment 300 can also include one or more user devices 307. In some aspects, user device 307 can be any of a personal digital assistant (PDA), desktop workstation, laptop or notebook computer, netbook, tablet, smart phone, smart watch or other wearable appliance, to name a few non-limiting examples, or any combination thereof. In some examples, user 332 can control and/or configure one or more IoT devices 301 using user device 307. For example, IoT device 301 can use radio frequency (RF) signals (e.g., using WLAN) to receive configuration and/or control information from user device 307.

IoT devices 301 can include any IoT device. As some non-limiting examples, IoT devices 301 can include smart appliances such as, but no limited to, smart TVs, smart refrigerators, smart washers, smart dryers, smart dishwashers, smart ovens and gas tops, smart microwaves, smart heating, ventilation, and air conditionings (HVACs), smart fans, smart blinds, or the like. As other non-limiting examples, IoT devices 301 can include smart home security systems, smart locks, smart fire alarms/systems, or the like. IoT devices 301 can include sensors used in homes, offices, factories, medical sensors, fitness sensors/trackers, or the like. It is noted that although some aspects of this disclosure are discussed with respect to some exemplary IoT devices, the present technology is not limited to these examples and can be applied to other IoT devices.

Figure 4:
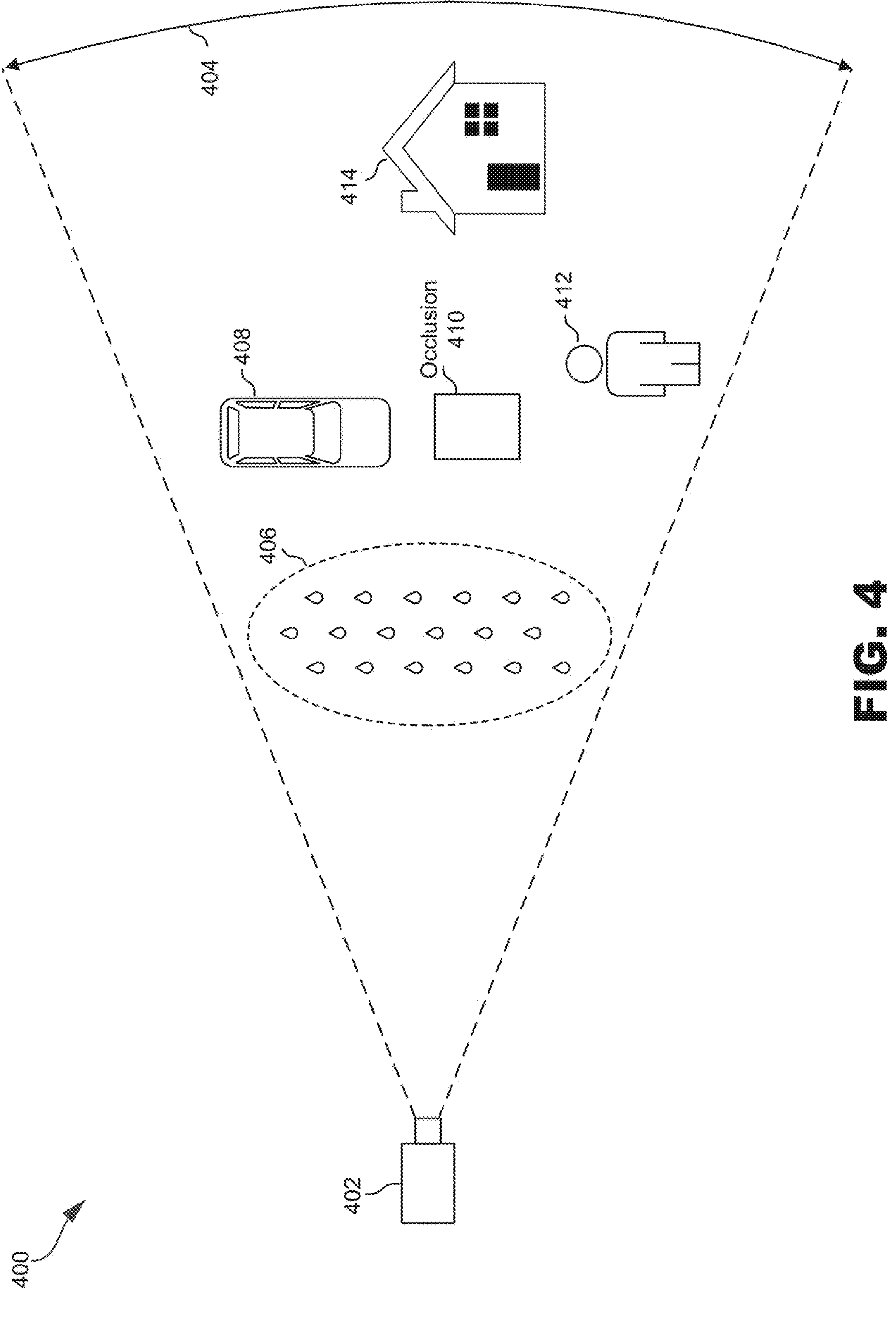
FIG. 4 illustrates an example of an IoT environment that includes an IoT camera that can be configured to eliminate occlusions, according to some aspects of the present disclosure.

FIG. 4 illustrates an example of an IoT environment 400 that includes an IoT camera 402 that can be configured to eliminate occlusions and enhance image/video data. That is, IoT camera 402 can process and enhance image data in order to yield image/video data that depicts the scene more clearly. Examples of tasks that can be implemented with enhanced image data include but are not limited to facial recognition and license plate recognition. In another example, the enhanced image data can be used to provide a continuous, unobstructed view of a scene.

In some examples, IoT camera 402 can correspond to one of IoT devices 301 that can be configured to communicate with one or more servers (e.g., system servers 305), user devices (e.g., user device 307), networks (e.g., network 303), other IoT devices (e.g., IoT devices 301), and/or any other electronic device. In some cases, IoT camera 402 can be part of a security or surveillance system and can be configured to capture and record image data and/or video data from IoT environment 400.

As illustrated, IoT camera 402 can have a field of view (FoV) 404 that can include one or more objects. For example, FoV 404 can include a vehicle 408, person 412, and house 414. In some examples, portions of FoV 404 may include one or more occlusions that can obstruct (e.g., hinder, obscure, obfuscate, blur, cloud, etc.) all or some portion of FoV 404. For instance, precipitation 406 can correspond to an occlusion that may obstruct the FoV 404 of IoT camera 402. That is, images and/or videos that include vehicle 408, person 412, and/or house 414 may be blurry or unclear because of precipitation 406. In another example, FoV 404 can include occlusion 410, which can correspond to an object (e.g., moving object, stationary object, etc.) that obstructs a portion of house 414. As used herein, an occlusion may include precipitation (e.g., rain, snow, hail, etc.), vegetation (e.g., plants, trees, weeds, etc.), smoke, insects, shadows, droplets, condensation, droppings, cobwebs, objects (e.g., trash can, debris, people, vehicles, etc.), and/or any other artifact, condition, and/or item that impedes all or a portion of FoV 404 of IoT camera 402. That is, an occlusion can include a short term or spurious event (e.g., tree branch swaying) as well as objects or events that persist for a longer period of time (e.g., spiderweb).

In some aspects, IoT camera 402 can identify movement or motion of one or more objects within FoV 404 (e.g., motion associated with precipitation 406, vehicle 408, occlusion 410, and/or person 412). In some examples, movement or motion detection can be used to identify one or more occlusions. For instance, IoT camera 402 may capture multiple image frames and implement an algorithm that detects movement or motion within the scene. In one illustrative example, IoT camera 402 may implement an optical flow algorithm to detect motion. For example, sparse and dense algorithms (e.g., Lucas-Kanade, Farneback, etc.) can be evaluated for accuracy and latency. The optical flow can be used to identify movement and estimate an amount of activity by calculating the magnitude of motion vectors at one or more points in the image and determining an average or sum of the magnitudes. In some aspects, such an algorithm may yield a value that can represent the overall motion in the scene and/or within a portion of the scene.

In another example, IoT camera 402 may implement a background subtraction algorithm to detect motion. For instance, a background model can be determined using a single-Gaussian model or a running average. The background subtraction can include comparing a current frame with the background model in order to identify pixels that deviate from the background (e.g., potential foreground pixels). A binary mask (e.g., foreground mask) can be created, in which the foreground pixels can be set to a value of '1' (e.g., white) and the remaining pixels can be set to a value of '0' (e.g., black). In some aspects, the foreground mask can be used to perform further processing or analysis such as blob detection, which can identify connected components (e.g., blobs) within the mask. In some cases, a level of activity can be estimated based on metrics such as the number of blobs, the size of the blobs, and/or motion direction. For example, a higher number of blobs or rapid changes in the position of the blobs can be indicative of a relatively high level of activity or motion. In some cases, all or a portion of the motion detection algorithm(s) (e.g., optical flow, background subtraction, etc.) may be performed by IoT camera 402. In further examples, all or a portion of the motion detection algorithm may be performed by a remote computing device such a server (e.g., system servers 305).

In another example, IoT camera 402 and/or a server that is coupled to IoT camera 402 may implement one or more machine learning algorithms that can be used to perform object detection and/or motion detection. In some cases, the machine learning algorithms can be used to identify one or more occlusions. For example, a machine learning algorithm may process frames corresponding to FoV 404 over a period of time and identify objects that are consistently present (e.g., persist) within the scene such as house 414. The machine learning model may also identify objects that are present during certain time periods. For example, the machine learning model may determine that vehicle 408 is usually parked at a particular location during the evening hours. Based on this information, the machine learning model may identify objects that are new or unexpected (e.g., precipitation 406, occlusion 410, and/or person 412).

In some aspects, IoT camera 402 can remove one or more occlusions from one or more image frames captured by IoT camera 402 from FoV 404. For example, IoT camera 402 can remove precipitation 406 from one or more image frames in order to yield revised image frames that exclude precipitation 406. In some cases, IoT camera 402 can remove an occlusion using an inpainting algorithm. That is, pixels corresponding to an occlusion can be filled in or replaced such that the scene is rendered without the occlusion.

In some cases, prior image data that is used to remove an occlusion (e.g., for inpainting) can be non-specific prior information. For instance, pixels associated with an occlusion can be replaced with pixels that are generated based on contextual information derived from the scene and/or objects within the scene that are in the vicinity of the occlusion.

In some aspects, prior image data that is used to replace an occlusion can be extracted from a previous image frame. For instance, precipitation 406 can be removed by using prior image data from frames obtained when there was no precipitation present and/or from image frames in which the precipitation is in a different location. That is, the prior image data used to remove an occlusion can be based on spatial and/or temporal history. In one illustrative example, IoT camera 402 may capture consecutive image frames that include precipitation 406 in which the individual droplets are located in different places (e.g., water droplets correspond to different pixel locations in each frame) and the spatial difference among image frames can be used to identify prior image data for removing precipitation 406. In another example, IoT camera 402 may access image frames that were captured at a similar time of day in which there was no precipitation and IoT camera 402 can extract prior image data from the previously captured image frame that can be used to remove precipitation 406.

FIG. 5 illustrates an example of image frames that can be processed to remove precipitation 406. As illustrated, the rain droplets associated with precipitation **406*a* in frame 502 are in different positions than the rain droplets associated with precipitation 406*b* in frame 504. IoT camera 402 can use the prior image data from frame 502 to replace image data in frame 504 corresponding to precipitation 406*b*. That is, IoT camera 402 can modify frame 504 based on prior image data from frame 502 to yield a revised image frame 506 that includes an unobstructed view of vehicle 408**.

In another example, the precipitation **406*a* and precipitation 406*b* can be removed by using prior image data from an image frame taken on a day without any precipitation (not illustrated). In some aspects, IoT camera 402 can select the image frame having the prior image data based on one or more conditions such as time of day, day of week, day of year, weather conditions, season, lighting conditions, object(s) present, etc. For example, IoT camera 402 may remove precipitation 406 by selecting an image frame that was taken a week before at a similar time of day during sunny weather and with vehicle 408** parked at the same or a similar location.

FIG. 6 illustrates an example of image frames that can be processed to remove occlusion 410 from in front of house 414. For example, frame 602 can correspond to a prior frame obtained when occlusion 410 was not present (e.g., an earlier day or an earlier time). Frame 604 can correspond to a current frame that includes occlusion 410, which partially obstructs house 414. In some aspects, the prior image data from frame 602 can be used to remove occlusion from frame 604. That is, image data corresponding to the pixels associated with occlusion 410 in frame 604 can be replaced with image data corresponding to the same pixels in frame 602.

In some cases, removing occlusion 410 can yield a revised image frame that eliminates occlusion 410 (e.g., the revised image frame would appear the same or similar to image frame 602). In some examples, the revised image frame can correspond to image frame 606 and include an outline 608 which indicates that an occlusion (e.g., occlusion 410) was removed from that portion of the frame. In some aspects, the outline 608 can correspond to a ghosting feature and/or a semi-transparent feature that allows a user to view image data behind occlusion 410. In some instances, outline 608 can provide an indication that the data within outline 608 is based on prior image data (e.g., image data may be stale if occlusion 410 has been present for an extended period of time).

Returning to FIG. 4, in some aspects, IoT camera 402 can determine a metric or score that is associated with a reconstructed image frame (e.g., an image frame that excludes at least one occlusion). In some cases, the metric or score can be indicative of an amount of degradation associated with removal of an occlusion. For example, a reconstructed image frame that omits a relatively large occlusion may be associated with a lower quality score than a reconstructed image frame that omits a relatively small occlusion. In another example, a reconstructed image frame that omits an occlusion that has been present for a relatively short amount of time may be associated with a higher quality score than a reconstructed image frame that omits an occlusion that has been present for a longer period of time. In another example, a reconstructed image frame that uses prior image data with a lower degree of spatial correspondence and/or temporal correspondence may be associated with a lower quality score than a reconstructed image frame that used prior image data with a high degree of spatial correspondence and/or temporal correspondence.

In some cases, if the quality score associated with an image or a video is less than a minimum threshold, IoT camera 402 may send an alert to a user device notifying the user of a potential issue with the reconstructed image data. In some aspects, IoT camera 402 may discontinue occlusion removal if the quality score is below a required threshold value.

In some aspects, IoT camera 402 may calculate an event frequency corresponding to an object or an occlusion. That is, the frequency associated with an object can be based on a rate of change of the object among a number of image frames. In one example, precipitation 406 can be associated with a relatively high frequency based on rate of change of the location of water droplets among image frames. In another example, person 412 walking across FoV 404 may also be associated with a relatively high frequency based on the movement of person 412 between image frames. In another example, occlusion 410 may correspond to a trash can that is left out overnight (e.g., 10 hours) and is therefore associated with a lower frequency because it is present continuously throughout that time period. Further, house 414 can have a frequency of zero because it is present in every image frame associated with FoV 404.

In some examples, a user may configure IoT camera 402 to remove objects or occlusions based on a classification and/or a frequency. For instance, a user may configure IoT camera 402 to remove occlusions caused by weather events such as precipitation 406. In another example, a user may configure IoT camera 402 to keep occlusions that have a relatively low frequency such as a trash can (e.g., occlusion 410). Alternatively, a user may configure IoT camera 402 to remove occlusion 410 based on a type of occlusion. For example, a user may not want to see trash cans when streaming a view of a landscape such as a camera directed at a city scene or a beach. In some instances, IoT camera 402 may provide a user interface (UI) that can be used to select objects for removal. For example, a user may be able to select occlusion 410 within an image and instruct IoT camera 402 to remove it from the image/video data.

In some aspects, a user may configure motion alerts from IoT camera 402 based on a classification and/or a frequency. For example, notifications or alerts may be suppressed or disabled for short-term occlusions that correspond to a spurious event, an unwanted event, and/or an uninteresting event. In one illustrative example, a user may disable motion alerts that are caused by tree branches swaying due to windy conditions. In another example, a user may disable motion alerts due to precipitation 406. In some configurations, motion alerts associated with person 412 walking by and/or vehicle 408 driving are unaffected by disabling unwanted motion alerts. That is, motion alerts due to precipitation 406 can be disabled while still maintaining motion alerts due to vehicle 408, for example.

In some instances, IoT camera 402 may include algorithms (e.g., machine learning algorithms, rule-based algorithms, etc.) that can be used to configure motion alerts. For example, a user may suppress or dismiss notifications due to spurious events (e.g., tree branch swaying) and IoT camera 402 may learn or determine that notifications for the same or similar events should be suppressed in the future. In another example, a user may configure IoT camera 402 (e.g., using a user device such as user device 307) to suppress one or more types of alerts. In one illustrative example, a device configuration or setting (e.g., input field, natural language input, drop-down list, etc.) could be used to describe or select uninteresting events for which notifications can be suppressed such as dogs running in the yard, trees swaying in wind, garbage truck driving by, etc. In some cases, events of interest (e.g., for which alerts are desired) could be selected using a device configuration or setting. For example, alerts can be enabled when IoT camera 402 detects unfamiliar faces, fallen trees, unfamiliar cars parked in driveway, etc.

In some cases, IoT camera 402 can be configured to expand or magnify an area of interest within FoV 404. For example, an area corresponding to person 412 can be expanded to perform facial recognition. In another example, an area corresponding to the license plate of vehicle 408 (e.g., as it is driving away from IoT camera 402) can be expanded to perform license plate recognition.

In some examples, IoT camera 402 can be configured to expand or magnify an area of interest within FoV 404 that is associated with movement or motion. For instance, IoT camera 402 may determine that person 412 is moving and expand an area corresponding to person 412. In some cases, IoT camera 402 can analyze a relatively large number of image frames to detect small amount of motion. For instance, IoT camera 402 may detect that vehicle 408, which is parked on the street, has an engine that is running based on small amount of detected motion (e.g., due to engine vibrations). In some examples, IoT camera 402 can utilize sub-pixels corresponding to magnify areas within an image frame associated with a small amount of motion (e.g., sub-pixels can be used to magnify the motion of vehicle 408 due to engine running). In another example, IoT camera 402 can use motion detection techniques to determine that a person or baby (not illustrated) is breathing while sleeping based on movement of chest (e.g., sub-pixels can be used to magnify motion or movement of chest).

Figure 7:
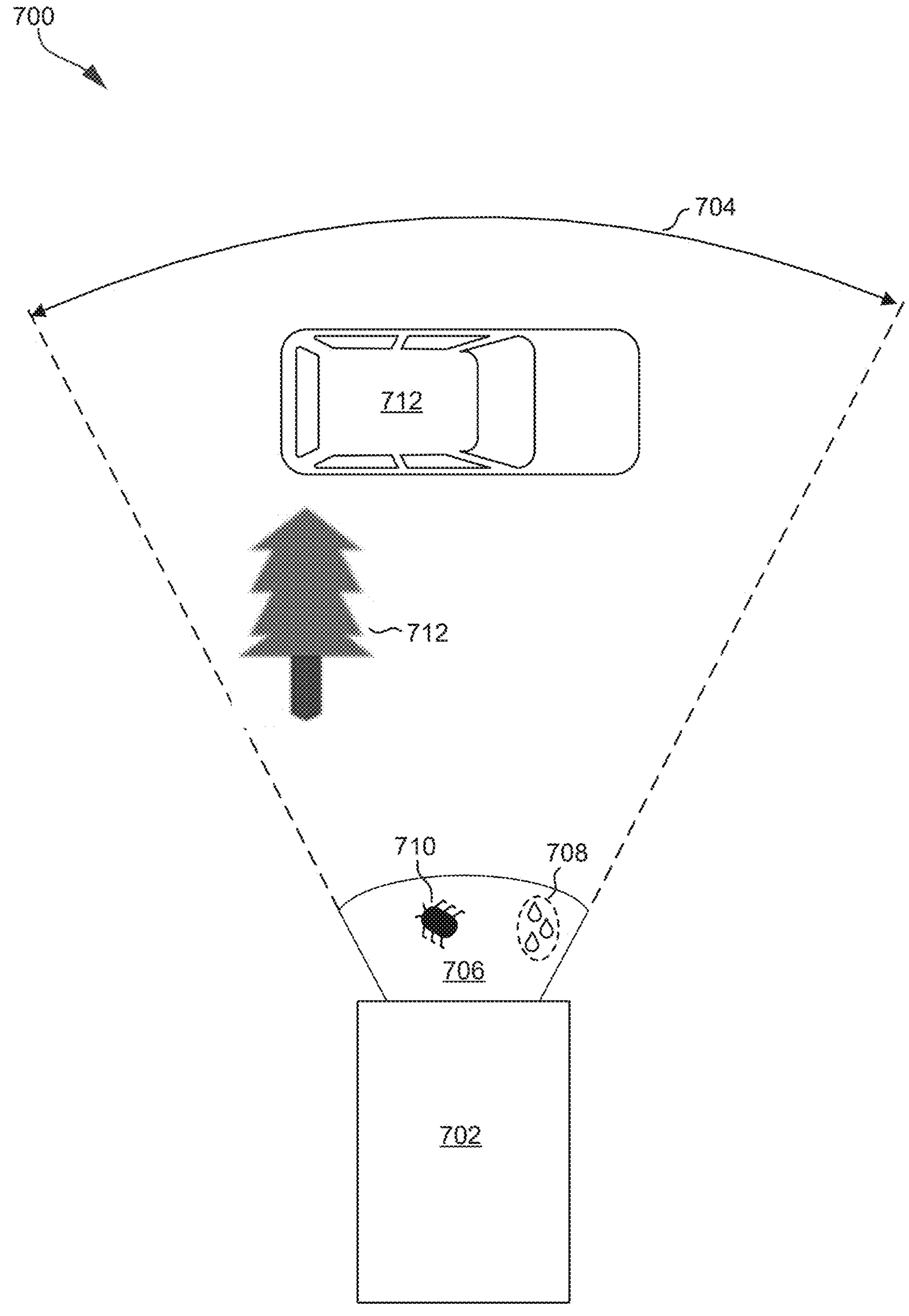
FIG. 7 illustrates another example of an IoT environment that includes an IoT camera that can be configured to eliminate occlusions, according to some aspects of the present disclosure.

FIG. 7 illustrates an example of an IoT environment 700 that includes an IoT camera 702 that can be configured to eliminate occlusions and enhance image/video data. In some aspects, IoT camera 702 can correspond to IoT camera 402. In some cases, IoT camera 702 can be configured to capture image frames from FoV 704.

As illustrated, IoT camera 702 may experience difficulties in capturing image data due occlusions caused by moisture 708 and/or insect 710 on lens 706 as well as by tree 712. For example, insect 710 can create awash-out problem in which autoexposure is turned down resulting in dark image data from FoV 704. In some aspects, IoT camera 702 can detect insect 710 and/or moisture 708 by analyzing image data from two or more image frames.

In some examples, IoT camera 702 can adjust one or more image sensor settings (e.g., exposure setting, infrared setting, aperture setting, etc.) to compensate for moisture 708 and/or insect 710. For example, IoT camera 702 can adjust (e.g., increase) the exposure such that vehicle 712 is visible and IoT camera 702 can ignore overexposure in areas corresponding to insect 710. As noted above with respect to FIG. 4, IoT camera 702 may also use prior image data to perform inpainting of pixels that are affected by moisture 708 and/or insect 710.

In some aspects, IoT camera 702 may send a message to a user device that can alert a user to the presence of one or more occlusions. For example, IoT camera 702 may detect insect 710 on lens 706 and send a message to a user device that alerts a user of possible issues caused by insect 710. In another example, IoT camera 702 may detect occlusions that slowly encroach on FoV 704 such as cobwebs or weeds that are present near lens 706. In some instances, IoT camera 702 can message a user device and request that the user clean up or remove the cause of such occlusions.

In some examples, IoT camera 702 can suppress motion alerts that are caused by spurious events that may correspond to an unwanted event or an uninteresting event. For instance, IoT camera 702 can be configured to suppress or disable notifications caused by movement of tree 712. That is, a user may configure IoT camera 702 to suppress motion alerts that are caused by uninteresting events (e.g., temporary or spurious occlusions) such as movement of tree 712. In some cases, IoT camera 702 may be configured to suppress alerts corresponding to certain types of uninteresting events (e.g., via device settings). For example, a user may select an option that configures IoT camera 702 to disable alerts based on a type of event (e.g., ignore this type of motion in the future). In some instances, IoT camera 702 may utilize algorithms (e.g., machine learning) to identify types of events that are of interest to a user. For instance, IoT camera 702 may determine that motion due to tree 712 is not of interest to a user based on the user dismissing the alert. In another example, IoT camera 702 may determine that motion due to landscapers that are present on a particular day and/or time should not trigger a motion alert. In another example, IoT camera 702 may determine that unfamiliar faces detected are of interest to the user (e.g., user views video for longer time, user views video multiple times, user saves video, user sends video to another person, etc.).

Figure 8A:
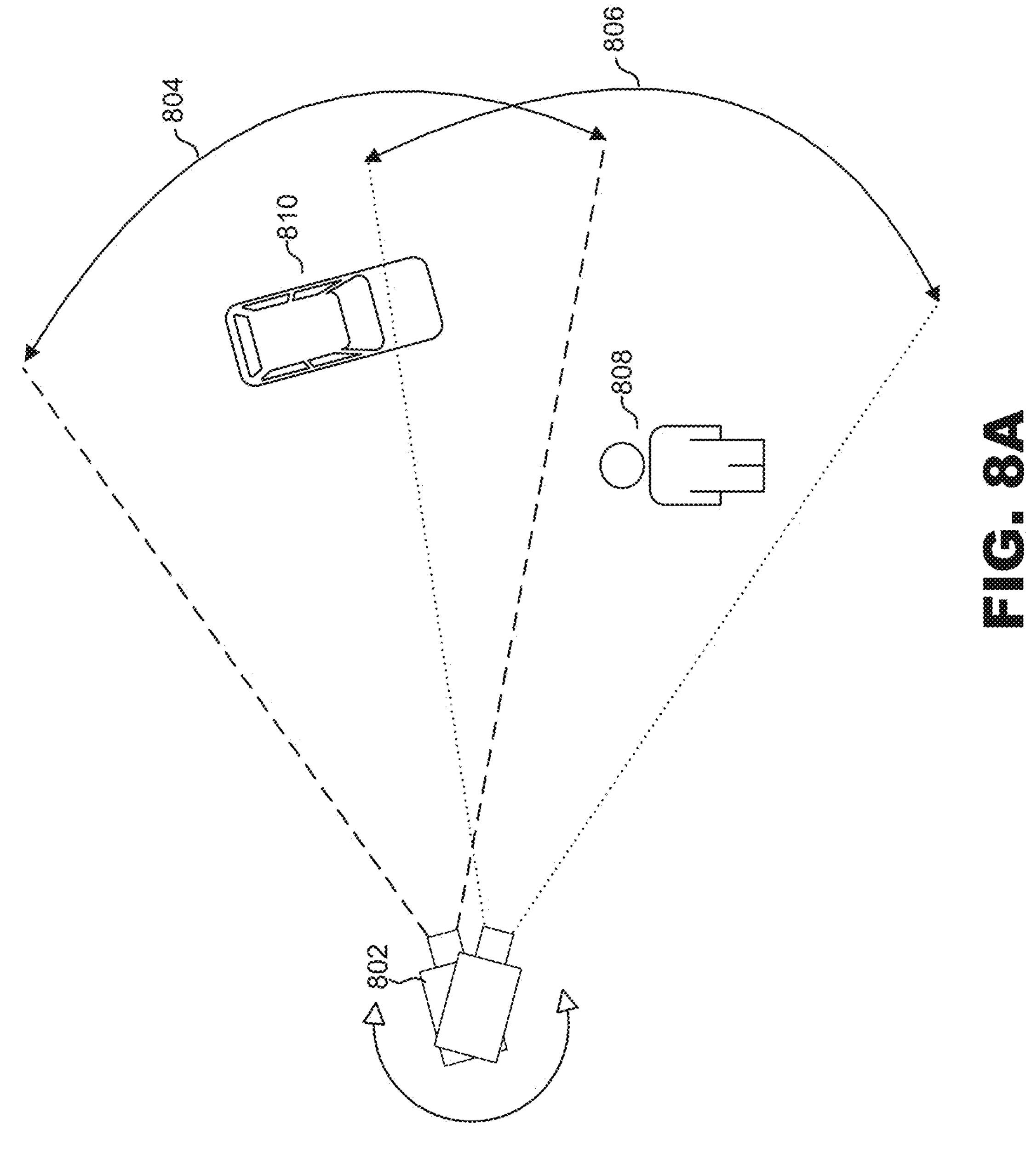
FIG. 8A and FIG. 8B illustrate an example of an IoT environment that includes a panning image sensor, according to some aspects of the present disclosure.

FIG. 8A illustrates a first example of IoT environment 800 that includes an IoT camera 802 that can be configured to eliminate occlusions and enhance image/video data. In some examples, IoT camera 802 can be configured to pan, move, or rotate. For instance, in some cases, IoT camera 802 can be configured to rotate up to 360 degrees. As illustrated, IoT camera 802 has a FoV 804 when IoT camera 802 is in a first position and a FoV 806 when IoT camera 802 is in a second position. Also, FoV 804 overlaps with FoV 806 such that FoV 804 includes vehicle 810 and FoV 806 includes person 808 and a portion of vehicle 810.

In some aspects, IoT camera 802 can be configured to rotate (e.g., change field of view) based on a motion trigger. For example, IoT camera 802 can rotate from the first position associated with FoV 804 to the second position associated with FoV 806 based on detected motion due to person 808. In some configurations, the motion trigger can include a sound detection (e.g., via at least one microphone), a motion detection (e.g., via a motion detector), and/or some other sensor input (e.g., from an inertial measurement unit (IMU), a gyroscope, an accelerometer, a light sensor, etc.). In some aspects, the motion trigger can be based on changes in one or more WiFi signals (e.g., motion can cause detectable changes in WiFi signals). In some cases, IoT camera 802 can be configured to rotate or pan based on a periodic setting (e.g., rotate every 30 seconds).

FIG. 8A illustrates a second example of IoT environment 800 which includes occlusion 812. As illustrated, occlusion 812 partially blocks a view of vehicle 810. Also, the entirety of occlusion 812 is located within FoV 804 while a portion of occlusion 812 is located in an area in which FoV 804 overlaps with FoV 806.

In some aspects, IoT camera 802 can be configured to remove occlusion 812 based on prior image data. In some cases, IoT camera 802 can perform special and/or temporal alignment of image frames from FoV 804 with image frames from FoV 806. For example, an image frame captured from FoV 806 (e.g., before occlusion 812 was present) can be used to remove occlusion 812 from an image frame captured from FoV 804. Similarly, an image frame captured from FoV 804 (e.g., before occlusion 812 was present) can be used to remove occlusion 812 from an image frame captured from FoV 806. That is, IoT camera 802 can keep a construction of additional FoV that is outside of a current frame.

FIG. 9 is a flowchart for a method 900 for processing image data. Method 900 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 9, as will be understood by a person of ordinary skill in the art.

Method 900 shall be described with reference to FIG. 4. However, method 900 is not limited to that example.

In step 902, the method 900 includes obtaining a first image frame and a second image frame corresponding to a field of view of an image sensor. For example, IoT camera 402 can obtain frame 502 and frame 504 corresponding to FoV 404.

In step 904, the method 900 includes identifying at least one occlusion within the second image frame based on a comparison between the first image frame and the second image frame, wherein the at least one occlusion obfuscates a portion of the field of view of the image sensor. For example, IoT camera 402 can identify precipitation 406 based on a comparison of frame 502 and frame 504. In some examples, the at least one occlusion includes at least one of precipitation, vegetation, smoke, an insect, a shadow, a droplet, a dropping, a cobweb, and an object.

In step 906, the method 900 includes removing the at least one occlusion from the second image frame to yield a revised second image frame, wherein the revised second image frame includes prior image data within an area corresponding to the portion of the field of view obfuscated by the at least one occlusion. For instance, IoT camera 402 can remove precipitation 406*b* from frame 504 to yield frame 506, wherein frame 506 includes prior image data within an area corresponding to the portion of the FoV 404 obfuscated by precipitation 406*b*. In some examples, the prior image data can be obtained from a third image frame corresponding to at least a portion of the field of view of the image sensor. For example, IoT camera 802 can obtain prior image data for removing occlusion 812 from an image frame associated with FoV 804 from an image frame corresponding to FoV 806.

In some aspects, the method 900 can include adjusting at least one setting associated with the image sensor in response to identifying the at least one occlusion, wherein the at least one setting includes at least one of an aperture setting, a shutter speed setting, an ISO setting, an exposure setting, and an illumination setting. For example, IoT camera 402 can adjust at least one setting in response to identifying precipitation 406.

In some cases, the method 900 can include modifying the revised second image frame to include a transparent outline of the at least one occlusion. For example, frame 606 includes outline 608 corresponding to occlusion 410.

In some examples, the method 900 can include determining a quality score for the revised second image frame, wherein the quality score is based on at least one of a size of the at least one occlusion and a temporal metric associated with the prior image data. For example, IoT camera 402 can determine a quality score for frame 606 that is based on a size of occlusion 410 or a temporal metric corresponding to prior image data obtained from frame 602.

In some aspects, the method 900 can include determining that the quality score is less than an acceptable threshold and in response, sending an alert to a user device that is associated with the image sensor. For example, IoT camera 402 can determine that the quality score for frame 606 is less than a threshold and IoT camera 402 can send an alert to user device 307.

In some instances, the method 900 can include sending a notification of the at least one occlusion to a user device that is associated with the image sensor. For example, IoT camera 402 can send a notification of occlusion 410 to user device 307 that is associated with IoT camera 402.

In some cases, the method 900 can include determining that a duration of the at least one occlusion is less than a threshold duration for performing occlusion removal. For example, IoT camera 402 can determine that a duration (e.g., frequency) of precipitation is less than a threshold for performing occlusion removal.

In some examples, the method 900 can include receiving, from a user device associated with the image sensor, a request to remove the at least one occlusion. For example, IoT camera 402 can receive a request from user device 307 to remove occlusion 410.

FIG. 10 is a flowchart for a method 1000 for processing image data. Method 1000 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 10, as will be understood by a person of ordinary skill in the art.

Figure 8B:
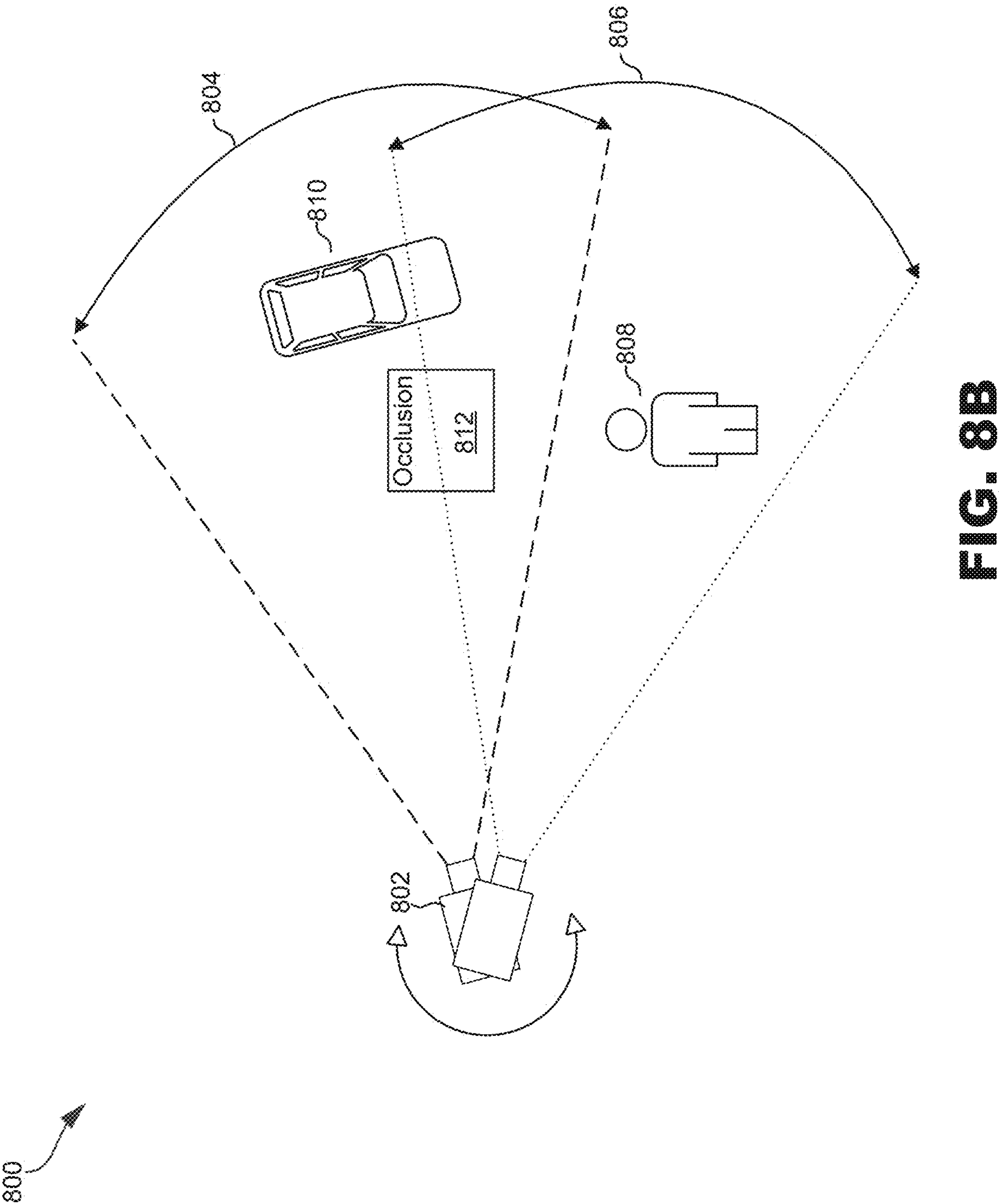

Method 1000 shall be described with reference to FIG. 8A and FIG. 8B. However, method 1000 is not limited to that example.

In step 1002, the method 1000 includes capturing, by an image sensor in a first position, a first plurality of image frames corresponding to a first field of view from the first position. For example, IoT camera 802 can capture a first plurality of image frames from a first position corresponding to FoV 804.

In step 1004, the method 1000 includes moving the image sensor from the first position to a second position in response to a movement trigger. For instance, IoT camera 802 can move to a second position corresponding to FoV 806 in response to a movement trigger. As noted above, a movement trigger can be based on data such as WiFi signal distortion, sensor data (e.g., sound, light, movement), etc.

In step 1006, the method 1000 includes capturing, by the image sensor in the second position, a second plurality of image frames corresponding to a second field of view from the second position. For example, IoT camera 802 can capture a second plurality of image frames from the second position corresponding to FoV 806.

In step 1008, the method 1000 includes identifying, based on the first plurality of image frames, at least one occlusion within the first field of view. For instance, IoT camera 802 can identify occlusion 812 within FoV 804.

In step 1010, the method 1000 includes determining that at least a portion of the at least one occlusion is located in a region that overlaps with the second field of view. For example, IoT camera 802 can determine that a portion of occlusion 812 is located in a region in which FoV 804 and FoV 806 overlap.

In step 1012 the method 1000 includes removing the at least one occlusion from one or more of the first plurality of image frames by using image data extracted from the second plurality of image frames. For instance, IoT camera 802 can remove occlusion 812 from one or more of the first plurality of image frames by using image data extracted from the second plurality of image frames (e.g., corresponding to FoV 806).

FIG. 11 is a flowchart for a method 900 for processing image data. Method 1100 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 11, as will be understood by a person of ordinary skill in the art.

Method 1100 shall be described with reference to FIG. 4. However, method 1100 is not limited to that example.

In step 1102, the method 1100 includes obtaining a plurality of frames corresponding to a field of view of an image sensor. For example, IoT camera 402 can obtain a plurality of frames corresponding to FoV 404.

In step 1104, the method 1100 includes detecting a movement of an object based on the plurality of frames. For instance, IoT camera 402 can detect a movement of an object (e.g., vehicle 408 or person 412) based on the plurality of frames.

In step 1106, the method 1100 includes identifying a region of pixels within each of the plurality of frames that corresponds to the object. For example, IoT camera 402 can identify a region of pixels within each of the plurality of frames that correspond to vehicle 408 (or a portion thereof).

In step 1108, the method 1100 includes magnifying the region of pixels in a sequence of frames from the plurality of frames to generate an enlarged view of the movement. For instance, IoT camera 402 can magnify the region of pixels corresponding to vehicle 408 in a sequence of frames to generate an enlarged view of the movement. In one illustrative example, the movement can correspond to a slight vibration caused by an engine that is running within vehicle 408 while vehicle 408 is stationary.

Figure 12:
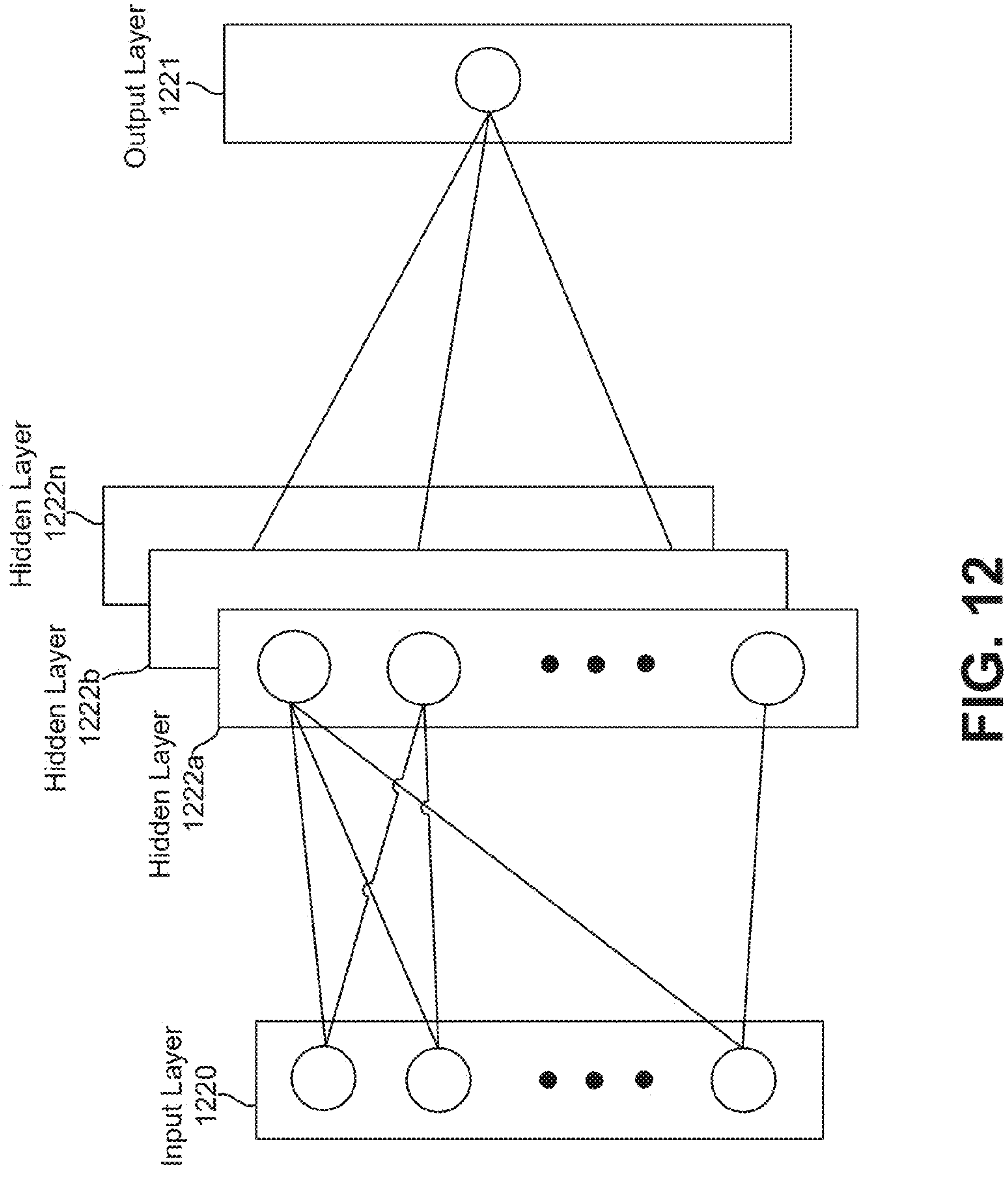
FIG. 12 is a diagram illustrating an example of a neural network architecture, according to some examples of the present disclosure.

FIG. 12 is a diagram illustrating an example of a neural network architecture 1200 that can be used to implement some or all of the neural networks described herein. The neural network architecture 1200 can include an input layer 1220 can be configured to receive and process data to generate one or more outputs. The neural network architecture 1200 also includes hidden layers 1222*a*, 1222*b*, through 1222*n*. The hidden layers 1222*a*, 1222*b*, through 1222*n* include "n" number of hidden layers, where "n" is an integer greater than or equal to one. The number of hidden layers can be made to include as many layers as needed for the given application. The neural network architecture 1200 further includes an output layer 1221 that provides an output resulting from the processing performed by the hidden layers 1222*a*, 1222*b*, through 1222*n*.

The neural network architecture 1200 is a multi-layer neural network of interconnected nodes. Each node can represent a piece of information. Information associated with the nodes is shared among the different layers and each layer retains information as information is processed. In some cases, the neural network architecture 1200 can include a feed-forward network, in which case there are no feedback connections where outputs of the network are fed back into itself. In some cases, the neural network architecture 1200 can include a recurrent neural network, which can have loops that allow information to be carried across nodes while reading in input.

Information can be exchanged between nodes through node-to-node interconnections between the various layers. Nodes of the input layer 1220 can activate a set of nodes in the first hidden layer 1222*a*. For example, as shown, each of the input nodes of the input layer 1220 is connected to each of the nodes of the first hidden layer 1222*a*. The nodes of the first hidden layer 1222*a* can transform the information of each input node by applying activation functions to the input node information. The information derived from the transformation can then be passed to and can activate the nodes of the next hidden layer 1222*b*, which can perform their own designated functions. Example functions include convolutional, up-sampling, data transformation, and/or any other suitable functions. The output of the hidden layer 1222*b* can then activate nodes of the next hidden layer, and so on. The output of the last hidden layer 1222*n* can activate one or more nodes of the output layer 1221, at which an output is provided. In some cases, while nodes in the neural network architecture 1200 are shown as having multiple output lines, a node can have a single output and all lines shown as being output from a node represent the same output value.

In some cases, each node or interconnection between nodes can have a weight that is a set of parameters derived from the training of the neural network architecture 1200. Once the neural network architecture 1200 is trained, it can be referred to as a trained neural network, which can be used to generate one or more outputs. For example, an interconnection between nodes can represent a piece of information learned about the interconnected nodes. The interconnection can have a tunable numeric weight that can be tuned (e.g., based on a training dataset), allowing the neural network architecture 1200 to be adaptive to inputs and able to learn as more and more data is processed.

The neural network architecture 1200 is pre-trained to process the features from the data in the input layer 1220 using the different hidden layers 1222*a*, 1222*b*, through 1222*n* in order to provide the output through the output layer 1221.

In some cases, the neural network architecture 1200 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network architecture 1200 is trained well enough so that the weights of the layers are accurately tuned.

To perform training, a loss function can be used to analyze an error in the output. Any suitable loss function definition can be used, such as a Cross-Entropy loss. Another example of a loss function includes the mean squared error (MSE), defined as E_total=Σ(½ (target−output)^2). The loss can be set to be equal to the value of E_total.

The loss (or error) will be high for the initial training data since the actual values will be much different than the predicted output. The goal of training is to minimize the amount of loss so that the predicted output is the same as the training output. The neural network architecture 1200 can perform a backward pass by determining which inputs (weights) most contributed to the loss of the network, and can adjust the weights so that the loss decreases and is eventually minimized.

The neural network architecture 1200 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network architecture 1200 can include any other deep network other than a CNN, such as an autoencoder, Deep Belief Nets (DBNs), Recurrent Neural Networks (RNNs), among others.

As understood by those of skill in the art, machine-learning based techniques can vary depending on the desired implementation. For example, machine-learning schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Minwise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Example Computer System

Figure 13:
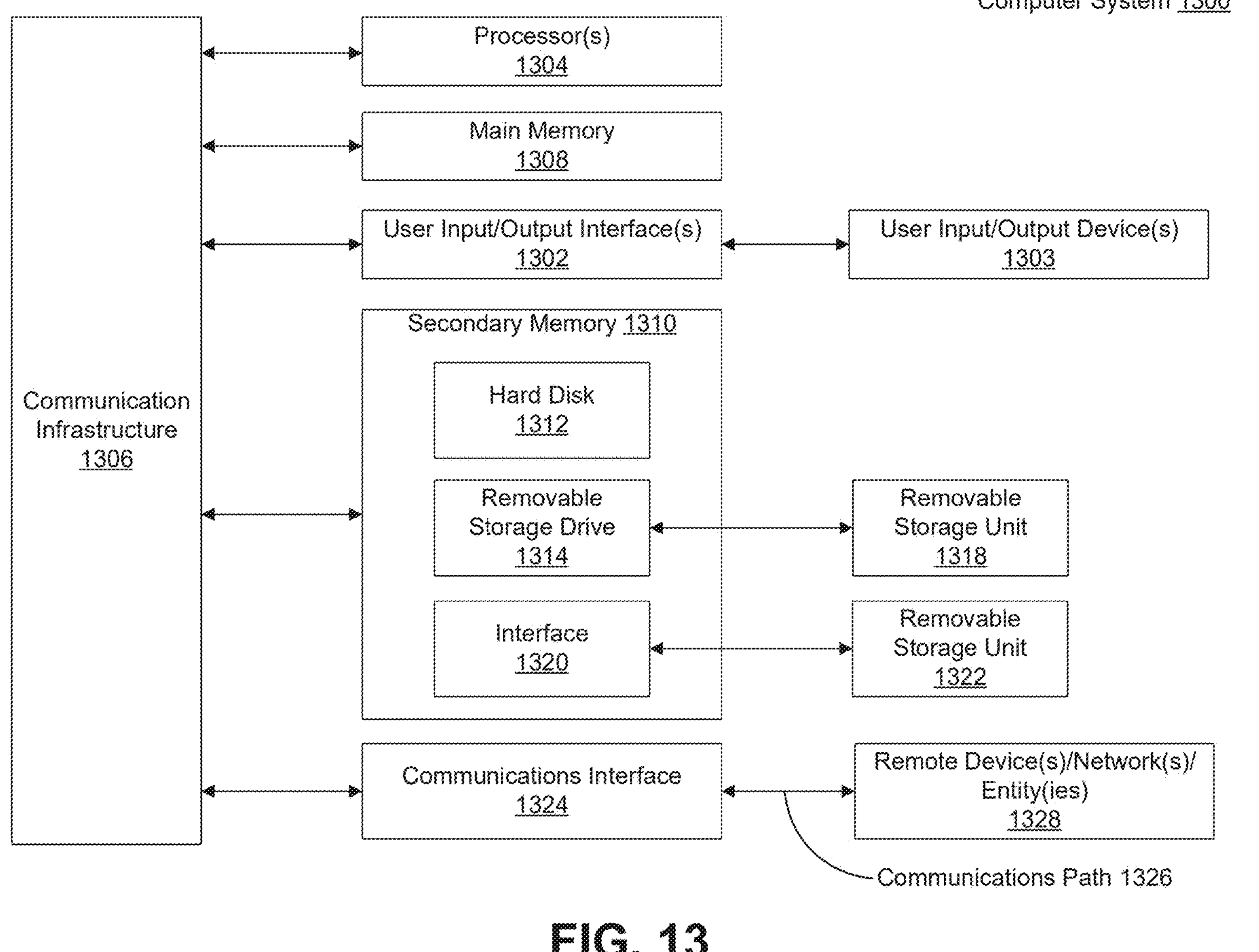
FIG. 13 illustrates an example computer system that can be used for implementing various aspects of the present disclosure.

Various aspects and examples may be implemented, for example, using one or more well-known computer systems, such as computer system 1300 shown in FIG. 13. For example, the media device 106 may be implemented using combinations or sub-combinations of computer system

1300. Also or alternatively, one or more computer systems 1300 may be used, for example, to implement any of the aspects and examples discussed herein, as well as combinations and sub-combinations thereof.

Computer system 1300 may include one or more processors (also called central processing units, or CPUs), such as a processor 1304. Processor 1304 may be connected to a communication infrastructure or bus 1306.

Computer system 1300 may also include user input/output device(s) 1303, such as monitors, keyboards, pointing devices, etc., which may communicate with communication infrastructure 1306 through user input/output interface(s) 1302.

One or more of processors 1304 may be a graphics processing unit (GPU). In some examples, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1300 may also include a main or primary memory 1308, such as random access memory (RAM). Main memory 1308 may include one or more levels of cache. Main memory 1308 may have stored therein control logic (e.g., computer software) and/or data.

Computer system 1300 may also include one or more secondary storage devices or memory 1310. Secondary memory 1310 may include, for example, a hard disk drive 1312 and/or a removable storage device or drive 1314. Removable storage drive 1314 may be a floppy disk drive, a magnetic tape drive, a compact disk drive, an optical storage device, tape backup device, and/or any other storage device/drive.

Removable storage drive 1314 may interact with a removable storage unit 1318. Removable storage unit 1318 may include a computer usable or readable storage device having stored thereon computer software (control logic) and/or data. Removable storage unit 1318 may be a floppy disk, magnetic tape, compact disk, DVD, optical storage disk, and/any other computer data storage device. Removable storage drive 1314 may read from and/or write to removable storage unit 1318.

Secondary memory 1310 may include other means, devices, components, instrumentalities or other approaches for allowing computer programs and/or other instructions and/or data to be accessed by computer system 1300. Such means, devices, components, instrumentalities or other approaches may include, for example, a removable storage unit 1322 and an interface 1320. Examples of the removable storage unit 1322 and the interface 1320 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 1300 may include a communication or network interface 1324. Communication interface 1324 may enable computer system 1300 to communicate and interact with any combination of external devices, external networks, external entities, etc. (individually and collectively referenced by reference number 1328). For example, communication interface 1324 may allow computer system xx00 to communicate with external or remote devices 1328 over communications path 1326, which may be wired and/or wireless (or a combination thereof), and which may include any combination of LANs, WANs, the Internet, etc. Control logic and/or data may be transmitted to and from computer system 1300 via communication path 1326.

Computer system 1300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some examples, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1300, main memory 1308, secondary memory 1310, and removable storage units 1318 and 1322, as well as tangible articles of manufacture embodying any combination of the foregoing. Such control logic, when executed by one or more data processing devices (such as computer system 1300 or processor(s) 1304), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 13. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to “one embodiment,” “an embodiment,” “an example embodiment,” or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression “coupled” and “connected” along with their derivatives. These terms are not necessarily intended as synonyms for each other. For example, some embodiments can be described using the terms “connected” and/or “coupled” to indicate that two or more elements are in direct physical or electrical contact with each other. The term “coupled,” however, can also mean that two or more elements are not in direct contact with each other, but yet still cooperate or interact with each other.

The breadth and scope of this disclosure should not be limited by any of the above-described exemplary embodiments, but should be defined only in accordance with the following claims and their equivalents.

Claim language or other language in the disclosure reciting “at least one of” a set and/or “one or more” of a set indicates that one member of the set or multiple members of the set (in any combination) satisfy the claim. For example, claim language reciting “at least one of A and B” or “at least one of A or B” means A, B, or A and B. In another example, claim language reciting “at least one of A, B, and C” or “at least one of A, B, or C” means A, B, C, or A and B, or A and C, or B and C, or A and B and C. The language “at least one of” a set and/or “one or more” of a set does not limit the set to the items listed in the set. For example, claim language reciting “at least one of A and B” or “at least one of A or B” can mean A, B, or A and B, and can additionally include items not listed in the set of A and B.

Illustrative examples of the disclosure include:

Aspect 1. A method comprising: obtaining a first image frame and a second image frame corresponding to a field of view of an image sensor; identifying at least one occlusion within the second image frame based on a comparison between the first image frame and the second image frame, wherein the at least one occlusion obfuscates a portion of the field of view of the image sensor; and removing the at least one occlusion from the second image frame to yield a revised second image frame, wherein the revised second image frame includes prior image data within an area corresponding to the portion of the field of view obfuscated by the at least one occlusion.

Aspect 2. The method of Aspect 1, further comprising: adjusting at least one setting associated with the image sensor in response to identifying the at least one occlusion, wherein the at least one setting includes at least one of an aperture setting, a shutter speed setting, an ISO setting, an exposure setting, and an illumination setting.

Aspect 3. The method of any of Aspects 1 to 2, further comprising: modifying the revised second image frame to include a transparent outline of the at least one occlusion.

Aspect 4. The method of any of Aspects 1 to 3, wherein the at least one occlusion includes at least one of precipitation, vegetation, smoke, an insect, a shadow, a droplet, a dropping, a cobweb, and an object.

Aspect 5. The method of any of Aspects 1 to 4, further comprising: determining a quality score for the revised second image frame, wherein the quality score is based on at least one of a size of the at least one occlusion and a temporal metric associated with the prior image data.

Aspect 6. The method of any of Aspect 5, further comprising: determining that the quality score is less than an acceptable threshold; and in response, sending an alert to a user device that is associated with the image sensor.

Aspect 7. The method of an of Aspects 1 to 6, further comprising: sending a notification of the at least one occlusion to a user device that is associated with the image sensor.

Aspect 8. The method of any of Aspects 1 to 7, wherein the prior image data is obtained from a third image frame corresponding to at least a portion of the field of view of the image sensor.

Aspect 9. The method of any of Aspects 1 to 8, further comprising: determining that a duration of the at least one occlusion is less than a threshold duration for performing occlusion removal.

Aspect 10. The method of any of Aspect 1 to 9, further comprising: receiving, from a user device associated with the image sensor, a request to remove the at least one occlusion.

Aspect 11. An apparatus comprising: at least one memory; and at least one processor coupled to the at least one memory, wherein the at least one processor is configured to perform operations in accordance with any one of Aspects 1 to 10.

Aspect 12. An apparatus comprising means for performing operations in accordance with any one of Aspects 1 to 10.

Aspect 13. A non-transitory computer-readable medium comprising instructions that, when executed by an apparatus, cause the apparatus to perform operations in accordance with any one of Aspects 1 to 10.

What is claimed is:

1. A system comprising:

one or more memories; and at least one processor coupled to at least one of the one or more memories and configured to perform operations comprising:

obtain a plurality of image frames that include at least a first image frame and a second image frame corresponding to a field of view of an image sensor;

identify at least one occlusion within the second image frame based on a comparison between the first image frame and the second image frame, wherein the at least one occlusion obfuscates a portion of the field of view of the image sensor;

calculate a frequency associated with the at least one occlusion based on a rate of change of at least one pixel location corresponding to the at least one occlusion among the plurality of image frames;

determine whether to remove the at least one occlusion based on the frequency; and in response to a determination to remove the at least one occlusion based on the frequency, remove the at least one occlusion from the second image frame to yield a revised second image frame, wherein the revised second image frame includes prior image data within an area corresponding to the portion of the field of view obfuscated by the at least one occlusion.

2. The system of claim 1, wherein the at least one processor is configured to perform operations comprising:

adjust at least one setting associated with the image sensor in response to identifying the at least one occlusion, wherein the at least one setting includes at least one of an aperture setting, a shutter speed setting, an ISO setting, an exposure setting, and an illumination setting.

3. The system of claim 1, wherein the at least one processor is configured to perform operations comprising:

modify the revised second image frame to include a transparent outline of the at least one occlusion.

4. The system of claim 1, wherein the at least one occlusion includes at least one of precipitation, vegetation, smoke, an insect, a shadow, a droplet, a dropping, a cobweb, and an object.

5. The system of claim 1, wherein the at least one processor is configured to perform operations comprising:

determine a quality score for the revised second image frame, wherein the quality score is based on at least one of a size of the at least one occlusion and a temporal metric associated with the prior image data.

6. The system of claim 5, wherein the at least one processor is configured to perform operations comprising:

determine that the quality score is less than an acceptable threshold; and in response, send an alert to a user device that is associated with the image sensor.

7. The system of claim 1, wherein the at least one processor is configured to perform operations comprising:

send a notification of the at least one occlusion to a user device that is associated with the image sensor.

8. The system of claim 1, wherein the prior image data is obtained from a third image frame corresponding to at least a portion of the field of view of the image sensor.

9. The system of claim 1, wherein the at least one processor is configured to perform operations comprising:

determine that a duration of the at least one occlusion is less than a threshold duration for performing occlusion removal.

10. The system of claim 1, wherein the at least one processor is configured to perform operations comprising:

receive, from a user device associated with the image sensor, a request to remove the at least one occlusion.

11. A computer-implemented method comprising:

obtaining a plurality of image frames that include at least a first image frame and a second image frame corresponding to a field of view of an image sensor;

identifying at least one occlusion within the second image frame based on a comparison between the first image frame and the second image frame, wherein the at least one occlusion obfuscates a portion of the field of view of the image sensor;

calculating a frequency associated with the at least one occlusion based on a rate of change of at least one pixel location corresponding to the at least one occlusion among the plurality of image frames;

determining whether to remove the at least one occlusion based on the frequency; and in response to determining to remove the at least one occlusion based on the frequency, removing the at least one occlusion from the second image frame to yield a revised second image frame, wherein the revised second image frame includes prior image data within an area corresponding to the portion of the field of view obfuscated by the at least one occlusion.

12. The computer-implemented method of claim 11, further comprising:

adjusting at least one setting associated with the image sensor in response to identifying the at least one occlusion, wherein the at least one setting includes at least one of an aperture setting, a shutter speed setting, an ISO setting, an exposure setting, and an illumination setting.

13. The computer-implemented method of claim 11, further comprising:

modifying the revised second image frame to include a transparent outline of the at least one occlusion.

14. The computer-implemented method of claim 11, wherein the at least one occlusion includes at least one of precipitation, vegetation, smoke, an insect, a shadow, a droplet, a dropping, a cobweb, and an object.

15. The computer-implemented method of claim 11, further comprising:

determining a quality score for the revised second image frame, wherein the quality score is based on at least one of a size of the at least one occlusion and a temporal metric associated with the prior image data.

16. The computer-implemented method of claim 15, further comprising:

determining that the quality score is less than an acceptable threshold; and in response, sending an alert to a user device that is associated with the image sensor.

17. The computer-implemented method of claim 11, further comprising:

sending a notification of the at least one occlusion to a user device that is associated with the image sensor.

18. The computer-implemented method of claim 11, wherein the prior image data is obtained from a third image frame corresponding to at least a portion of the field of view of the image sensor.

19. The computer-implemented method of claim 11, further comprising:

determining that a duration of the at least one occlusion is less than a threshold duration for performing occlusion removal.

20. A non-transitory computer-readable medium having instructions stored thereon that, when executed by at least one computing device, cause the at least one computing device to perform operations comprising:

obtain a plurality of image frames that include at least a first image frame and a second image frame corresponding to a field of view of an image sensor;

identify at least one occlusion within the second image frame based on a comparison between the first image frame and the second image frame, wherein the at least one occlusion obfuscates a portion of the field of view of the image sensor;

calculate a frequency associated with the at least one occlusion based on a rate of change of at least one pixel location corresponding to the at least one occlusion among the plurality of image frames;

determine whether to remove the at least one occlusion based on the frequency; and in response to a determination to remove the at least one occlusion based on the frequency, remove the at least one occlusion from the second image frame to yield a revised second image frame, wherein the revised second image frame includes prior image data within an area corresponding to the portion of the field of view obfuscated by the at least one occlusion.

* * * * *